March 13, 1945.  B. F. WHEELER  2,371,275
HEATING ELEMENT
Filed Dec. 26, 1942
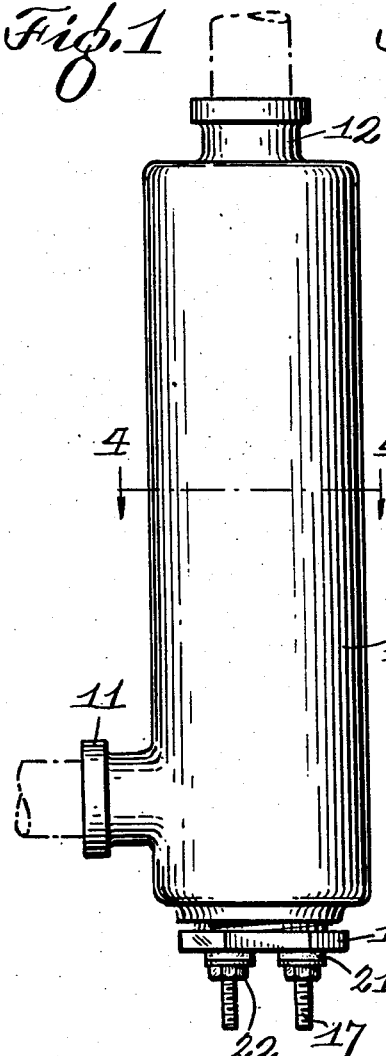
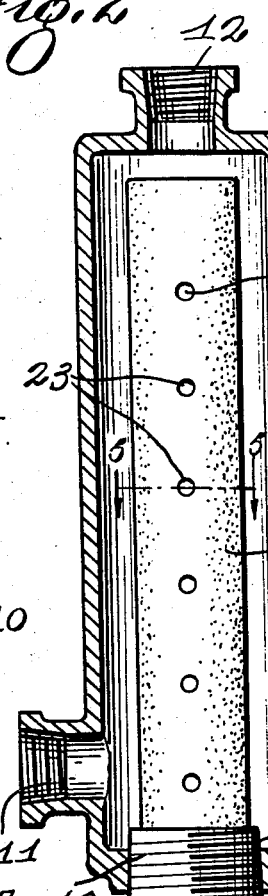
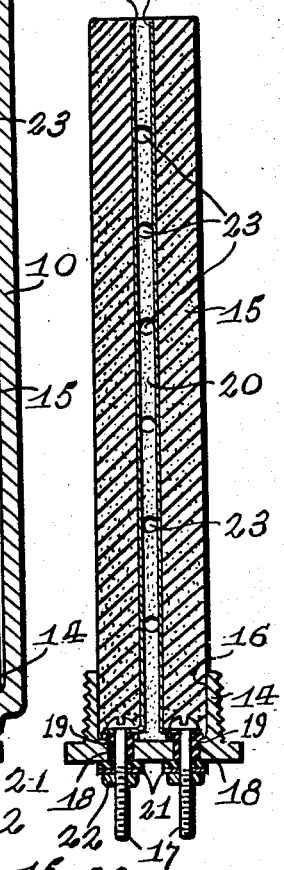
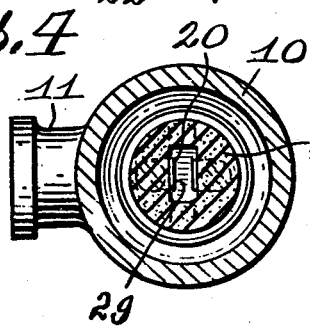
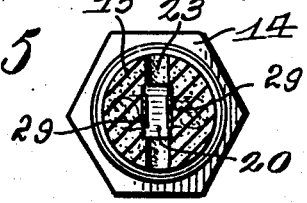
Inventor
Byrhl F. Wheeler
By Robie & Martin
Attorneys Patented Mar. 13, 1945

2,371,275

UNITED STATES PATENT OFFICE 2,371,275

HEATING ELEMENT

Byrhl F. Wheeler, Balston Spa, N. Y., assignor of fourteen per cent to Joseph Vigneault and twenty-six per cent to Martinien Lacombe, both of Montreal, Quebec, Canada Application December 26, 1942, Serial No. 470,150

4 Claims. (Cl. 219—39)

The present invention relates to heating elements and, more particularly, to electric elements of a cast lithic-like nature adapted to heat water.

Electric heating elements operating in water have been known for a long time and are based on a number of operating principles. In most cases, however, the heating effect is obtained by forcing an electric current through a resistance, whether of a metallic-wire type, the carbonaceous type or the water itself.

Said heating elements, however, possess drawbacks attributable to the breaking down, corrosion and other chemical changes occurring in the resistance itself, or, although said resistance satisfactorily withstands the destructive effect of the electric current, the overall efficiency is low.

The present invention has been conceived to avoid the disadvantages noted above in a self-supporting, homogeneous, element using both the water and a lithic-like composition as heating resistances.

Consequently, the main object of the invention may be stated to reside in a water-heating element of very high efficiency.

Another important object of the invention concerns a composition for water-immersed electric heaters, which composition is highly refractory to heat and other chemical changes.

A further object of the invention relates to an electric heating element of the character described which is adapted to a multiciplicity of uses, and which can be made into various shapes and sizes.

A still further object relates to the provision of a heating element easily manufactured to close limits of electrical standards and at relatively low cost.

Other objects and advantages of the invention will become apparent as the description progresses.

As an example of the kind of heating elements rendered possible by the invention, a form of such an element is shown in the annexed drawing, wherein the element is used as a practical application to a water heater.

In the drawing:

Figure 1 is a perspective view of the water heater,

Figure 2 is a vertical section through the heater,

Figure 3 is a vertical section through the element,

Figure 4 is a section taken on line 4—4 of Figure 1, and

Figure 5 is a section taken on the line 5—5 of Figure 2.

Referring to said drawing, wherein similar reference characters represent corresponding parts throughout, the numeral 10 indicates the casing of the heater, which casing is preferably cast in one piece to include inlet opening 11, outlet opening 12 and a threaded aperture 13 at the bottom adapted to receive a plug 14. Said plug is intended to support the element 15, fitting snugly within the well 16 formed in the plug, by means of the terminal bolts 17.

As shown to advantage in Figure 3, the plug is provided with a pair of spaced apertures 18 of a size such as to accommodate the insulating bushings 19 inserted over the terminal bolts 17.

Said bolts 17 are embedded in the body of the element 15, during manufacture, and serve to conduct the electric current to the mass of the element by means of the parallel spaced conducting strips 29, extending longitudinally the length of the element, on each side of a central rectangular bore 20 axially formed in the center of said element 15. The strips 29 are bent right-angularly at the bottom and perforated to receive the bolts 17 and to contact the heads thereof to form a good electric connection. In order to facilitate circulation, apertures 23 are formed transversely in the body of the element through the inner bore.

So constructed, the element is readily attachable to the plug by the simple expedient of inserting the bolts through the bushings 19, placing insulating washers 21 over the bolts protruding outside the plug and securing said bolts by the nuts 22. The element mounted in the plug may then be attached to a variety of heaters, such as the one shown.

The terminal arrangement shown is at one end only of the element although, obviously, connections could be disposed as easily at both ends for special purposes.

As stated previously, the feature of the invention resides in the lithic-like resistance composition used to form the body of the heating element. Said composition is constituted of native mineral ores, a siliceous insulator and a Portland cement binder. It is adapted to be cast, in the cold state and in the form of an aqueous paste; the hardening process is the natural setting of the cement, whereby a homogeneous, lithic, indestructible body is obtained.

More specifically, the current-conducting portion of the composition is represented by copper and iron ores, traces of silver ore, all as sulphur salts, and traces of gold in the free state.

Said ores may be a mixture of iron pyrite ($FeS_2$) and chalcocite ($Cu_2S$) or, in some cases, the combined iron-and-copper ore: chalcopyrite ($CuFeS_2$). Generally speaking, the traces of gold and silver exist naturally in the ores found in some mines and, accordingly, do not need to be added separately. The percentage of the ores used is variable, according to the specific use of the element; in practice, it varies between 2% to 15% at the most. The balance is taken up by siliceous matter, mostly in the form of silica sand, and Portland cement.

The purpose of the sand is to disseminate, more or less, the particles of the current-conducting ore particles and, accordingly, to increase the resistance of the element to current conduction. The percentage of the siliceous matter may be comprised between a minimum of 30% and a maximum of 60%.

All the constituents of the composition are suitably ground, unrefined, properly mixed and made into a paste with water. The element is then cast in the shape desired, the conducting strips placed in position, terminal bolts inserted, etc., and the whole allowed to set normally.

As soon as the setting is complete, the element is ready for use, although its exact electrical characteristics will not be fixed at first, but will slightly change after the first few hours of use and will gradually improve with age.

It has been found that elements constructed according to the invention are remarkably stable to corrosion and other destructive effects caused by ordinary waters; furthermore, the homogeneous structure renders said elements strong, resistant to breakage and quite free from the calcareous accumulations common to heaters operating constantly in water.

As might be expected, the efficiency of such a water-immersed element is high, much higher than other elements using metallic heating resistances. Impartial tests, conducted with various heating units made according to the invention, have shown conclusively that: up to 98% of the theoretical B. t. u.'s available in a given electrical unit of electric power are obtained as usable heat from said heating units.

From the foregoing, it will be evident that the present invention is a most useful advance in the art of electric immersion heaters.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. As an article of manufacture, a lithic immersion heating element constituted of Portland cement having disseminated therein grains of copper and iron sulphide ores in their natural states and grains of gold and silver, and means for conducting electricity from an outside source to the inside of said element.

2. As a composition of matter for molding electric immersion heating elements, a paste formed of Portland cement to which silica and a mixture of powdered ores of copper, iron, gold and silver have been added, said mixture forming from 2% to 15% of the total bulk.

3. A composition of matter including:

| | Percent |
|---|---|
| Portland cement | 40 to 80 |
| Siliceous matter | 30 to 60 |
| Iron and copper ores (as sulphides) | 2 to 15 |
| Gold | Traces |
| Silver | Traces |

4. An electric immersion heater having electrodes constituted of Portland cement, siliceous matter and grains of iron, copper and silver sulphide ores disseminated in the mass of cement and siliceous matter, and opposed current-conducting means embedded in said electrodes.

BYRHL F. WHEELER.